United States Patent
Ma et al.

(10) Patent No.: US 11,728,547 B2
(45) Date of Patent: Aug. 15, 2023

(54) POLYMER ELECTROLYTE LAMINATION LAYER FOR LITHIUM METAL BATTERY

(71) Applicant: Apple Inc., Cupertino, CA (US)

(72) Inventors: Lin Ma, Sunnyvale, CA (US); Alan A. Ritchie, Menlo Park, CA (US); Bernd Jurgen Neudecker, Los Gatos, CA (US); Richard M. Mank, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 231 days.

(21) Appl. No.: 17/028,285

(22) Filed: Sep. 22, 2020

(65) Prior Publication Data

US 2022/0093969 A1    Mar. 24, 2022

(51) Int. Cl.

| | |
|---|---|
| *H01M 50/449* | (2021.01) |
| *H01M 4/66* | (2006.01) |
| *H01M 4/75* | (2006.01) |
| *H01M 10/0565* | (2010.01) |
| *H01M 4/38* | (2006.01) |
| *H01M 4/134* | (2010.01) |
| *H01M 50/497* | (2021.01) |
| *H01M 50/46* | (2021.01) |
| *H01M 10/0568* | (2010.01) |
| H01M 10/052 | (2010.01) |

(52) U.S. Cl.
CPC ......... *H01M 50/449* (2021.01); *H01M 4/134* (2013.01); *H01M 4/382* (2013.01); *H01M 4/661* (2013.01); *H01M 4/75* (2013.01); *H01M 10/0565* (2013.01); *H01M 10/0568* (2013.01); *H01M 50/461* (2021.01); *H01M 50/497* (2021.01); *H01M 10/052* (2013.01); *H01M 2300/0082* (2013.01)

(58) Field of Classification Search
None
See application file for complete search history.

(56) References Cited

U.S. PATENT DOCUMENTS

| | | | |
|---|---|---|---|
| 2005/0042515 A1 | 2/2005 | Hwang et al. | |
| 2018/0294476 A1* | 10/2018 | Zhamu | H01M 10/052 |

FOREIGN PATENT DOCUMENTS

EP    3396736 A1    10/2018

OTHER PUBLICATIONS

Lin, D., et. al., "Reviving the lithium metal anode for high-energy batteries", Nature Nanotechnology, Review Article, Published online Mar. 7, 2017 www.nature.com/naturenanotechnology (13 pp).

(Continued)

*Primary Examiner* — Laura Weiner
(74) *Attorney, Agent, or Firm* — Young Basile Hanlon & MacFarlane, P.C.

(57) ABSTRACT

An electrochemical cell has a cathode having a cathode current collector and a cathode active material, an anode having an anode current collector and an anode active material comprising lithium metal, a liquid electrolyte, a separator between the cathode active material and the anode active material, and a polymer electrolyte lamination layer bonding the anode to the separator. The polymer electrolyte lamination layer is formulated using a crosslinked polymer, a lithium salt, a plasticizer, and an anode additive.

9 Claims, 2 Drawing Sheets

(56) References Cited

OTHER PUBLICATIONS

Li, M., et al., "New Concepts in Electrolytes", Chemical Reviews, https://dx.doi.org/10.1021/acs.chemrev.9b00531, Special Issue: Beyond Li Battery Chemistry, (37 pp).

Zhou, H., et. al., "Protective coatings for lithium metal anodes: Recent progress and future perspectives", Journal of Power Sources, https://doi.org/10.1016/j.jpowsour.2019.227632 , (18 pp).

Zhou, W., et al., "Plating a Dendrite-Free Lithium Anode with a Polymer/Ceramic/Polymer Sandwich Electrolyte", Journal of the American Chemical Society, pubs.acs.org/JACS, (11 pp).

* cited by examiner

POLYMER ELECTROLYTE LAMINATION LAYER FOR LITHIUM METAL BATTERY

TECHNICAL FIELD

This disclosure relates to a highly concentrated polymer electrolyte layer laminating a lithium metal anode and a separator of a lithium metal battery.

BACKGROUND

Lithium metal batteries have received significant attention as advanced high-performance next generation batteries. The Lithium metal battery is attractive due to its high volumetric and gravimetric energy densities. However, these high voltage rechargeable batteries can face performance obstacles due at least in part to non-uniform and fluffy lithium plating, which can lead to low Coulombic efficiency and other concerns. The non-uniform lithium plating is caused by several factors. The direct contact between the liquid electrolyte and the lithium metal anode leads to continuous reaction at the lithium metal interface, which consumes the liquid electrolyte and forms an unfavorable solid electrolyte interface (SEI) layer. The loose contact between the lithium metal anode and the separator allows the fluffy lithium dendrites to grow into the liquid electrolyte space. The non-uniform current distribution at the lithium metal interface, particularly at high current rates, attributes to non-uniform and fluffy lithium plating. Other factors may also contribute to the non-uniform lithium plating. The resulting structural instability limits the applications of these batteries.

SUMMARY

Disclosed herein are implementations of polymer electrolyte lamination layers, electrochemical cells having a polymer electrolyte lamination layer bonding the anode to the separator, and lithium metal batteries having a plurality of the electrochemical cells each with a polymer electrolyte lamination layer.

A polymer electrolyte lamination layer as disclosed herein is configured to bond a lithium metal anode to a separator. The polymer electrolyte lamination layer comprises a crosslinked polymer, a lithium salt, a plasticizer, and an anode additive.

The polymer electrolyte lamination layer can provide greater than 20 N/m dry lamination strength and greater than 20 N/m wet lamination strength between the anode and the separator.

The polymer electrolyte lamination layer can have an ionic conductivity of greater than $1.0 \times 10^{-5}$ S/cm.

As a non-limiting example, the polymer electrolyte lamination layer as disclosed herein can comprise a crosslinked polymer selected from crosslinked PVDF-HFP, crosslinked PEGDMA, crosslinked polyDDA, crosslinked PVB, crosslinked PUA, crosslinked PEO, crosslinked PAN, crosslinked PMMA, and copolymers thereof, the crosslinked polymer having a molecular weight of between 400,000 g/mol and 900,000 g/mol; a plasticizer; a lithium salt; and an anode additive.

As another non-limiting example, the polymer electrolyte lamination layer can comprise a crosslinked polymer backbone of crosslinked PVDH-HFP copolymer with a molecular weight of between 400,000 g/mol and 900,000 g/mol. The molar ratio of PVDF:HFP is 15-40:1. The plasticizer is an ionic liquid, such as N-propyl-N-methylpyrrolidinium bis(fluorosulfonyl)imide (Pyr13FSI). A lithium salt, such as LiFSI, is present at a concentration of 3 M or greater. The anode additive is LiBOB present at a concentration of between 4 wt % and 10 wt %, inclusive.

Electrochemical cells disclosed herein have a cathode having a cathode current collector and a cathode active material, an anode having an anode current collector and an anode active material comprising lithium metal, a liquid electrolyte and a separator between the cathode active material and the anode active material. The polymer electrolyte lamination layer bonds the anode to the separator. An external pressure on the electrochemical cell can be 20 psi or less.

Lithium metal batteries disclosed herein have a plurality of electrochemical cells having the polymer electrolyte lamination layer. An external pressure on the lithium metal battery can be 20 psi or less.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
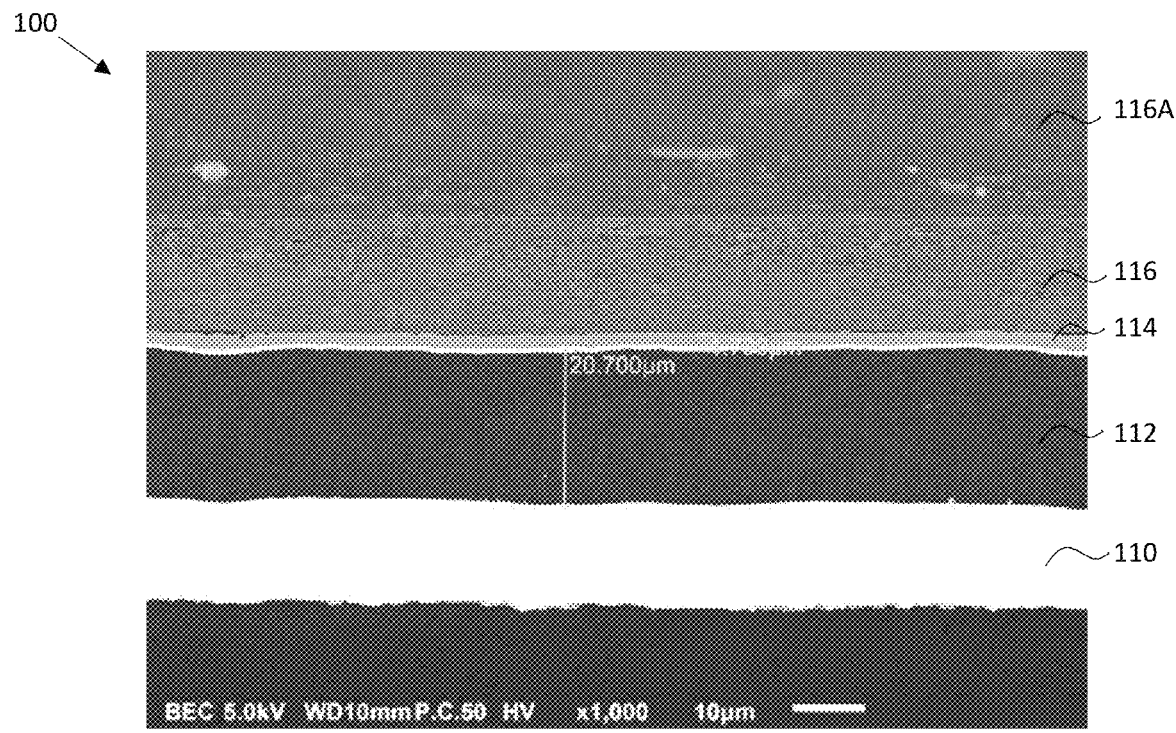
FIG. 1A is a cross-sectional image from a scanning electron microscope (SEM) of a portion of an electrochemical cell having a polymer electrolyte lamination layer as disclosed herein after cycling under low external pressure.

Although lithium metal batteries are attractive due to their high volumetric and gravimetric energy densities, non-uniform lithium plating and fluffy lithium plating causes performance issues that can limit the applications of these batteries. The non-uniform and fluffy lithium plating can be caused, in part, by 1) contact between the liquid electrolyte and the lithium metal anode, which leads to continuous reaction at the lithium metal interface, consuming the liquid electrolyte and forming an unfavorable SEI layer; 2) loose contact between the lithium metal anode and the separator, which allows the fluffy lithium dendrites to grow into the liquid electrolyte space; and 3) non-uniform current distribution at the lithium metal interface. The non-uniform and fluffy lithium plating cause the swelling of the anode, which lowers the volumetric energy density of the cell. External applied pressure to the cell is helpful for dense lithium plating; however, external pressure is unfavorable or infeasible in many practical applications.

The polymer electrolyte lamination layer disclosed herein reduces the non-uniform and fluffy lithium plating while lowering or eliminating external pressure requirements, resulting in stable cell performance. The polymer electrolyte lamination layer disclosed herein has at least three functions. The polymer electrolyte lamination layer serves to laminate the lithium metal anode to the separator, providing strong bonding between the two layers. The internal pressure provided by the bond onto the lithium metal facilitates dense lithium plating at low or no external pressure. The polymer electrolyte lamination layer acts as a protective layer to block contact between the liquid electrolyte and the lithium metal anode, reducing or preventing the continuous reaction between the electrolyte and the lithium metal. The polymer electrolyte lamination layer serves as an additional electrolyte layer as the polymer electrolyte lamination layer is lithium ion conductive, while promoting uniform lithium distribution and plating at the electrode interface.

The polymer electrolyte lamination layer disclosed herein bonds the anode active material to the separator in an electrochemical cell having a cathode active material, a cathode current collector, an anode current collector, lithium metal-containing anode active material, a separator and liquid electrolyte. The polymer electrolyte lamination layer comprises a crosslinked polymer backbone and functional components including lithium salt, a plasticizer and an anode additive.

The formulations of the polymer electrolyte lamination layer disclosed herein achieve high ionic conductivity while also achieving strong mechanical strength. The crosslinked polymer backbone caps the lithium metal-containing anode active material and provides lamination between the separator and the anode active material. The crosslinked polymer forming the backbone is used as a polymer electrolyte matrix to enhance the stability with the liquid electrolyte, while the functional components enable the electrolyte functionality of the lamination layer. The plasticizer assists in the ionic conduction, the high lithium salt concentration provides uniform lithium ion distribution and dense lithium plating, and the anode additives stabilize the SEI layer by forming a uniform and dense interface layer, among other functions.

The crosslinked polymer backbone is a cross-linked polymer having a molecular weight of between 400,000 g/mol and 900,000 g/mol. The cross-linked polymer can be a crosslinked poly(vinylidene fluoride)-co-hexafluoropropylene (PVDF-HFP), a crosslinked polyethylene glycol dimethacrylate (PEGDMA), crosslinked polydiallyldimethylammonium chloride (polyDDA), crosslinked polyvinyl butyral (PVB), crosslinked poly(urethane acrylate) (PUA), crosslinked polyethylene glycol (PEO), crosslinked polyacrylonitrile (PAN), crosslinked poly(methyl methacrylate) (PMMA), or a copolymer thereof. The crosslinked polymer backbone may be a polyelectrolyte, a polymeric salt that has a cationic or an anionic backbone, such as lithiated Nafion®, a sulfonated tetrafluoroethylene based fluoropolymer-copolymer, and poly(lithium styrene sulfonate). The crosslinked polymer backbone can be one polymer or can be a mixture of more than one polymer. The crosslinking can be achieved by both chemical crosslinking (during synthesis) and physical crosslinking (such as the dissociated lithium salt coordination with the polymer's fluorine atoms).

The plasticizer may be an ionic liquid, such as cation-imidazolium, pyridinium, pyrrolidinium, phosphonium, anion-FSI, and bis(trifluoromethane)sulfonimide (TFSI) or a combination thereof. The plasticizer may be a low-molar-mass organic, such as polyethylene glycol (PEG)-200, PEG-400, PEG-600, succinonitrile (SN), and glutaronitrile (GN) or a combination thereof. The plasticizer may be an organic solvent, such as dimethoxyethane (DME), ethyl methyl carbonate (EMC), dimethyl carbonate (DMC), ethylene carbonate (EC), propylene carbonate (PC), and dimethylacetamide (DMAc) or a combination thereof. The plasticizer may be a mixture of one or more ionic liquid, low-molar-mass organic, and organic solvent. The plasticizer is present in the polymer electrolyte lamination layer in amounts from 10 wt % to 50 wt %.

The lithium salt can be one or a combination of more than one of lithium bis (fluorosulfonyl) imide (LiFSI), lithium bis(trifluoromethanesulfonyl)imide (LiTFSI), lithium bis (oxalato)borate (LiBOB), lithium hexafluorophosphate ($LiPF_6$), lithium tetrafluoroborate ($LiBF_4$), and lithium perchlorate (LiClO), as non-limiting examples. As a non-limiting example, a dual salt system can be used, such as LiFSI—LiBOB. The lithium salt concentration can be 3 M or greater, and in some embodiments 3.8 M or greater, and in some embodiments 4 M or greater. The lithium salt concentration of the polymer electrolyte lamination layer can be equal to or greater than the lithium salt concentration of the liquid electrolyte used in the electrochemical cell. This level of lithium salt concentration eliminates the mass exchange with the liquid electrolyte.

The anode additive can be one or more of LiBOB, lithium fluoride (LiF), lithium nitrate ($LiNO_3$), lithium difluoro (oxalato)borate (LiDFOB), $LiBF_4$, lithium 2-trifluoromethyl-4,5-dicyanoimidazolide (LiTDI), vinyl chloride (VC), fluoroethylene carbonate (FEC), vinyl ethylene carbonate (VEC), GN, SN, polystyrene (PS), 3-(phenylsulfonyl)propionitrile (PSPN), hexane tricarbonitrile (HTCN), aluminum iodide ($AlI_3$), aluminum bis(trifluoromethanesulfonyl)imide ($Al(TFSI)_3$), and inorganic particles, such as silicon dioxide ($SiO_2$), titanium dioxide ($TiO_2$), aluminum oxide ($Al_2O_3$), aluminum hydroxide oxide ($\gamma$-AlO(OH)), and boron nitride (BN). Anode additives can be added up to about 15 wt % of the total weight of the polymer electrolyte lamination layer.

The polymer electrolyte lamination layer may comprise more than one distinct sublayers. The distinct sublayers can vary in one or more of the crosslinked polymers and any one or more of the functional components.

The polymer electrolyte lamination layer is coated onto an anode or separator with assistance of a casting solvent, which will be evaporated during the drying process. The casting solvent can be DMAc, dimethylformamide (DMF), N-methyl-2-pyrrolidone (NMP), tetramethylurea (TMU), N,N-diethylacetamide (DEAc), triethyl phosphate (TEP) and mixtures thereof.

The polymer electrolyte lamination layer disclosed herein provides strong bonding of the lithium metal-containing anode active material to the separator, and the bonding is retained in liquid electrolyte throughout cycling. If the anode has a coating, the polymer electrolyte lamination layer may alternatively bond the separator to the coating on the anode active material. The strong bonding is achieved by long, flexible polymer chains. The crosslinking structure helps to maintain the integrity of the polymer layer in the liquid electrolyte, preventing or reducing dissolution of the layer by the aggressive liquid electrolyte. The polymer electrolyte lamination layer provides greater than 20 N/m dry lamination strength and greater than 20 N/m wet lamination strength between the anode and the separator.

The polymer electrolyte lamination layer disclosed herein functions as a protection cap to the lithium metal-containing anode, and this protection cap function is retained during cycling. The polymer electrolyte lamination layer effectively blocks reactive solvent from the liquid electrolyte from reaching the lithium metal-containing anode. The crosslinked polymer backbone, with very different solubility parameters than that of the liquid electrolyte solvent, is not dissolved or swollen by the solvent in the liquid electrolyte. The lithium salt and plasticizer are already within the solid region of the crosslinked polymer before seeing the solvent, and bond tightly to the crosslinked polymer chain, preventing the solvent from permeating through the polymer electrolyte lamination layer. The lithium metal-containing anode active material and polymer electrolyte lamination layer interface remains free of solvent and allows chemical and electrochemical stability.

The polymer electrolyte lamination layer has strong mechanical properties, with greater than 100% elongation at break and greater than 10 MPa Young's modulus. The strong mechanical properties contribute to the strong bonding provided by the polymer electrolyte lamination layer, assist in enabling the electrochemical cell to operate with low to no external pressure, and reduce swell of cycled anodes. Cycled anodes with the polymer electrolyte lamination layer disclosed herein show significantly less swell than anodes without the polymer electrolyte lamination layer. The polymer electrolyte lamination layer can be between about 1 μm and 3 μm in thickness, so does not impact the overall thickness of the cell.

The polymer electrolyte lamination layer disclosed herein is an electrolyte with bulk resistance (as a function of lithium ion conductivity) and low interface impedance to the lithium metal-containing anode. The proper choice of lithium salt and anode additives in conjunction with the casting solvent enables the interfacial stability between the crosslinked polymer and lithium metal. The high lithium salt concentration allows fast and uniform lithium diffusion at the interface upon plating. The ionic conductivity of the polymer electrolyte lamination layer may be greater than $1.0 \times 10^{-5}$ S/cm, and in some embodiments is greater than $1.0 \times 10^{-4}$ S/cm. The favorable SEI formed by the high lithium salt concentration and the anode additives stabilizes the interface during cycling.

The polymer electrolyte lamination layer disclosed herein reduces or eliminates the need for external applied pressure on the electrochemical cell and lithium metal battery. External applied pressure to the cell or battery promotes dense lithium plating and reduced cyclable lithium loss during cycling. External pressures as high as about 180 psi have been shown to be beneficial. However, external pressure is unfavorable or infeasible in many practical applications. Thus, lowering or eliminating the external pressure while achieving stable cell performance is an important achievement. The polymer electrolyte lamination layer disclosed herein provides for operation of a lithium metal battery with an external pressure of 20 psi or less while achieving greater than 90% density of plated lithium, reducing or eliminating dendrite growth and fluffy lithium deposition.

One embodiment of a polymer electrolyte lamination layer comprises a crosslinked polymer backbone of crosslinked PVDH-HFP copolymer with a molecular weight of between 400,000 g/mol and 900,000 g/mol. The molar ratio of PVDF:HFP is 15-40:1. The plasticizer is an ionic liquid, such as N-propyl-N-methylpyrrolidinium bis(fluorosulfonyl)imide (Pyr13FSI). A lithium salt, such as LiFSI, is present at a concentration of 3 M or greater and may be 3.5 M or greater or 4 M or greater. The lithium salt concentration in the polymer electrolyte lamination layer can be greater than or equal to the lithium salt concentration of the liquid electrolyte. The casting solvent is an organic solvent such as DMAc, and the anode additive is LiBOB present at a concentration of between 4 wt % and 10 wt %, inclusive.

The PVDF, with a high dielectric, is effective in dissociating the contained lithium salt thereby generating a large quantity of charge carriers for conduction. The highly depolarized CF bond forms a Lewis base complexation with the lithium ions, and thus retards the ordering to crystalline PVDF, further assisting lithium ion conduction. Using an anode additive such as LiBOB assists in SEI formation. LiBOB also enables faster drying times in the processing of the polymer electrolyte lamination layer.

One example of a polymer electrolyte lamination layer as disclosed herein comprises 33 wt % of crosslinked PVDH-HFP copolymer, 21 wt % of Pyr13FSI as the plasticizer, 4 M concentration of LiFSI, 4 wt % of LiBOB as the anode additive, and DMAc as the casting solvent. The polymer electrolyte lamination layer has a wet peel strength of 21 N/m, a dry peeling strength of 21 N/m, and a conductivity of $1.2 \times 10^{-4}$ S/cm.

Figure 1B:
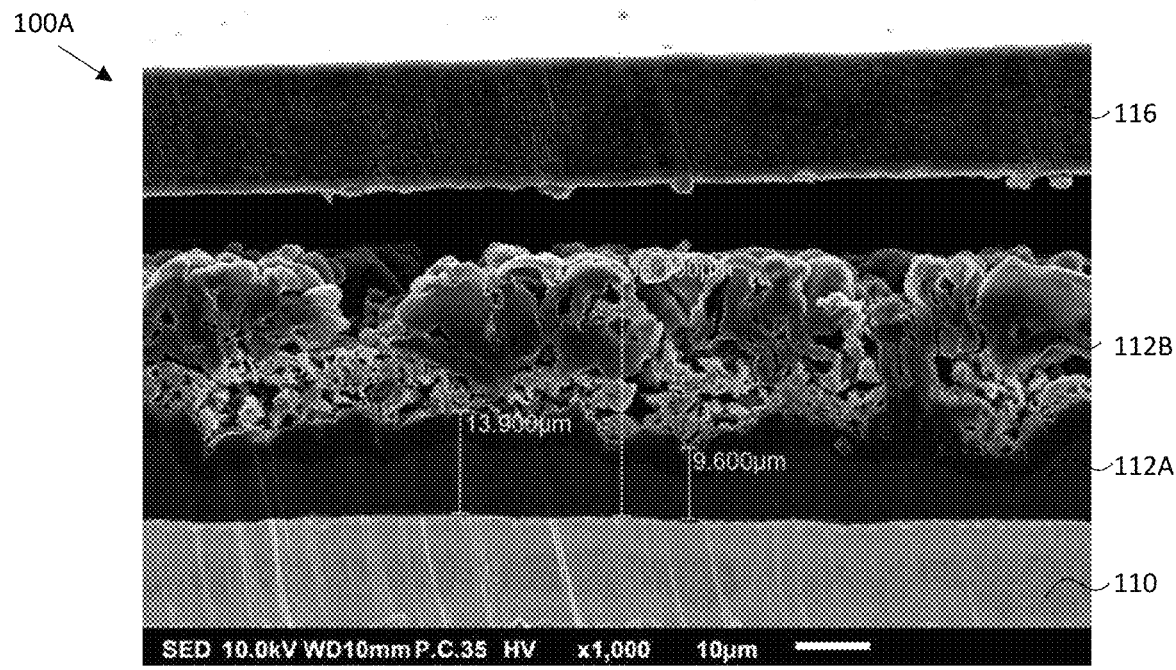
FIG. 1B is a cross-sectional SEM image of a portion of an electrochemical cell without a polymer electrolyte lamination layer as disclosed herein after cycling under low external pressure.

An electrochemical cell was formed with a copper foil anode current collector 110 with 11 μm of plated lithium metal and 10 μm of lithium metal seed as the anode active material 112, a cathode with LCO as the cathode active material, a porous polyethylene separator 116, and a carbonate liquid electrolyte with an ionic liquid. The polymer electrolyte lamination layer 114 of the example formulation bonds the separator 116 and the lithium metal of the anode active material 112. The electrochemical cell was cycled, and a single charge at less than 10 psi external pressure achieved 100% density plated lithium. FIGS. 1A and 1B compare this electrochemical cell 100 with an electrochemical cell without the polymer electrolyte lamination layer 100A. FIG. 1A is a cross-section SEM analysis of the electrochemical cell 100 with the polymer lamination layer 114 after 20 cycles at 0 psi external pressure. The cathode is not shown. FIG. 1A shows a well bonded anode stack with densely plated lithium with no external pressure applied during cycling. The plated lithium and the lithium seed, together as anode active material 112, are fused so well that the interface is indistinguishable. All layers remain tightly bonded throughout the cycle operation. FIG. 1B is a cross-section SEM analysis of the electrochemical cell 100A without the polymer electrolyte lamination layer after 60 cycles at 20 psi external pressure. The cathode is not shown. The cell in FIG. 1B shows that the layers are not well bonded even under 20 psi of external pressure. The separator 116, the plated lithium 112B, and the lithium seed 112A debond from each other. The surface of the separator 116A is labeled for clarity. The debonding of the separator 116 causes the plated lithium 112B to fluff to an undesirably low density, porous layer of reduced electrochemically active material with an increased thickness, lowering the energy density. As seen in FIG. 1A, the plated lithium and lithium seed had a thickness of 20.7 μm after cycling, while the plated lithium and the lithium seed in FIG. 1B had swelled to a thickness of 35.1 μm.

Electrochemical cells as described above, one with the polymer electrolyte lamination layer and one without, were tested to compare swelling at varying charge rates and cycles under low external pressure. Both electrochemical cells were cycled at 20 psi external pressure. After 20 cycles, both C/7 and C/4 charge rate cells maintained 100% capacity. The cycled anodes with the polymer electrolyte lamination layer showed significantly less swell than the anodes without the polymer electrolyte lamination layer after 20 cycles at 20 psi. At the C/7 charge rate, the thickness of the anode without the polymer electrolyte lamination layer was 25 μm while the thickness of the anode with the polymer electrolyte lamination layer was 20 μm, which is equivalent to the theoretical thickness of 10 μm lithium seed and the 10 μm plated lithium. At the C/4 charge rate, the thickness of the anode without the polymer electrolyte lamination layer was 33 μm while the thickness of the anode with the polymer electrolyte lamination layer was 24 μm, slightly thicker than the theoretical thickness of 20 μm. Cycling at 20 psi external pressure, after 60 cycles, the anode with the polymer electrolyte lamination layer retains>99% of its initial capacity. At the C/4 charge rate, the thickness of the anode without the polymer electrolyte lamination layer was 44 μm while the thickness of the anode with the polymer electrolyte lamination layer was 35 μm.

Figure 2:
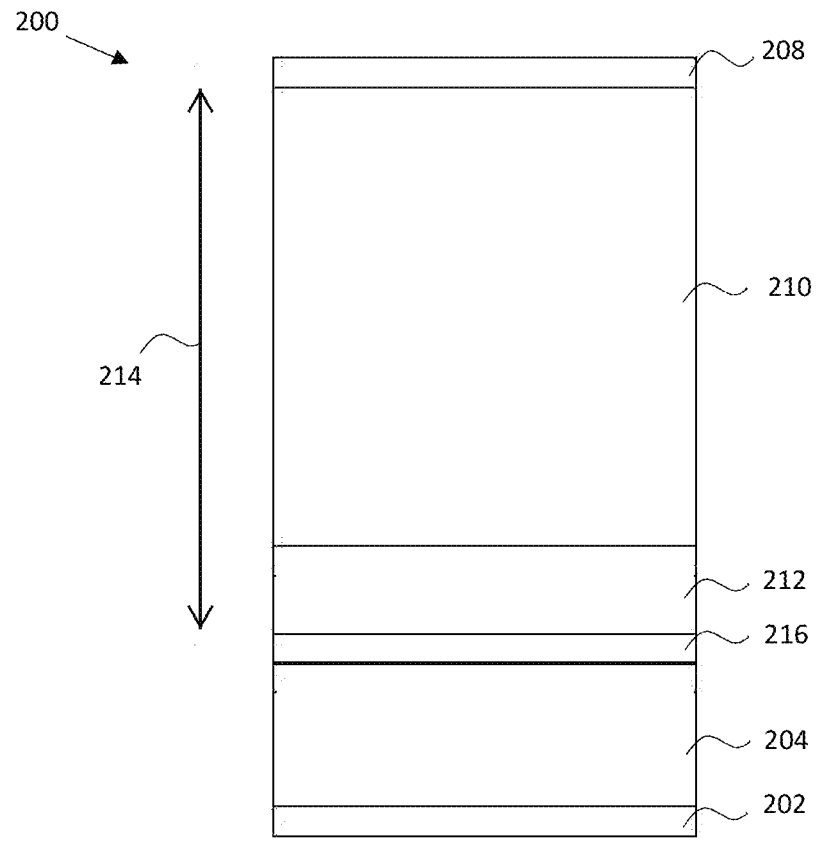
FIG. 2 is a cross-sectional schematic of an electrochemical cell having a polymer electrolyte lamination layer as disclosed herein.

An aspect of the disclosed embodiments is an electrochemical cell 200, the layers of which are shown in cross-section in FIG. 2. The electrochemical cell 200 has an anode current collector 202 and an anode active material 204 disposed on the anode current collector 202. The electrochemical cell 200 also has a cathode current collector 208 and a cathode active material 210 disposed on the cathode current collector 208. The cathode active material 210 and the anode active material 204 are separated by a separator 212, and the liquid electrolyte 214 is represented with the arrow. The polymer electrolyte lamination layer 216 as disclosed herein bonds the separator 212 and the anode active material 204. In some aspects, a coating may be formed on the anode active material 204, with the polymer electrolyte lamination layer 216 bonding the separator 212 to the anode coating. In some aspects, a cathode coating may be formed on the cathode active material 210 between the cathode active material 210 and the separator 212. In some aspects, a separator coating may be formed on the separator 212 on the cathode side of the separator 212.

The cathode current collector 208 can be, for example, an aluminum sheet or foil. Cathode active material 210 can include one or more lithium transition metal oxides which can be bonded together using binders and optionally conductive fillers such as carbon black. Lithium transition metal oxides can include, but are not limited to, $LiCoO_2$, $LiNiO_2$, $LiNi_{0.8}Co_{0.15}Al_{0.05}O_2$, $LiMnO_2$, $Li(Ni_{0.5}Mn_{0.5})O_2$, $LiNi_xO_yMn_zO_2$, Spinel $Li_2Mn_2O_4$, $LiFePO_4$ and other polyanion compounds, and other olivine structures including $LiMnPO_4$, $LiCoPO_4$, $LiNi_{0.5}Co_{0.5}PO_4$, and $LiMn_{0.33}Fe_{0.33}Co_{0.33}PO_4$. In some embodiments, the cathode active material may be composed of only electrochemically active material, such as sintered LCO.

The anode active material 204 can comprise lithium metal. The anode active material 204 can be, for example, lithium metal and can include both a lithium metal seed layer and plated lithium. The anode active material 204 is not otherwise particularly limited, and can comprise lithium alloys, lithium-containing metal oxides, lithium-containing metal sulfides, lithium-containing metal nitrides, carbonaceous materials such as graphite, and combinations thereof. The anode current collector 202 can be a copper, nickel or titanium sheet or foil, as a non-limiting example.

The separator 212 is a porous, tortuous mechanical layer or membrane that physically separates the cathode active material from the polymer electrolyte lamination layer and other layers of the stack. The separator can be between 0.1 μm and 30 μm in thickness and may be composed of a single layer or multi-layer of organic or inorganic materials, such as polyolefins and glass fibers, respectively. The separator may be single or double sided coated with organic (e.g., polyvinylidene fluoride (PVdF)) and/or inorganic (e.g., magnesium hydroxide ($Mg(OH)_2$)) materials. The single sided separator coating may preferably be a coating at the cathode side. Alternatively, the separator coating at the cathode side may be provided by a coating on the cathode, rather than a coating on the separator.

The liquid electrolyte 214 is located inside the separator 212 and its coating layers, if present, as well as the cathode active material 210 and is in contact with the polymer electrolyte lamination layer 216, and the cathode current collector 208 while being compatible with all four layers under all operation conditions. The liquid electrolyte can be composed of at least one lithium salt (e.g., LiFSI) dissolved in at least one organic solvent (e.g. DMC) or inorganic liquid solvent. The liquid electrolyte 214 may contain at least one ionic liquid (e.g., Py13FSI) and may contain organic and inorganic additives (e.g., BTFE, LiBOB).

Lithium metal batteries are disclosed and comprise multiple electrochemical cells 200.

It is to be understood that the terminology used herein is used for the purpose of describing particular embodiments only and is not intended to limit the scope of the disclosure. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Unless defined otherwise, all technical and scientific terms used herein have the same meanings as commonly understood by one of ordinary skill in the art to which this invention belongs.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An electrochemical cell, comprising:
    a cathode having a cathode current collector and a cathode active material;
    an anode having an anode current collector and an anode active material comprising lithium metal;
    a separator between the cathode active material and the anode active material;
    a polymer electrolyte lamination layer bonding the anode to the separator, the polymer electrolyte lamination layer comprising:
        a crosslinked polymer having a molecular weight of between 400,000 g/mol and 900,000 g/mol;
        a first lithium salt having a concentration of 3M or greater;
        an ionic liquid; and
        0 wt % to 15 wt. % of an anode additive; and
    a liquid electrolyte comprising a solvent and a second lithium salt with a concentration less than or equal to the concentration of the first lithium salt, wherein the polymer electrolyte lamination layer is configured to prevent the liquid electrolyte from contacting the anode, and
    wherein the ionic liquid is N-propyl-N-methylpyrrolidinium bis(fluorosulfonyl)imide (Pyr13FSI), the first lithium salt is LiFSI, and the anode additive is LiBOB.

2. The electrochemical cell of claim 1, wherein the polymer electrolyte lamination layer comprising the crosslinked polymer is a crosslinked polymer selected from the group consisting of crosslinked PVDF-HFP, crosslinked PEGDMA, crosslinked polyDDA, crosslinked PVB, crosslinked PUA, crosslinked PEO, crosslinked PAN, crosslinked PMMA, and copolymers thereof.

3. An electrochemical cell, comprising:
    a cathode having a cathode current collector and a cathode active material;

an anode having an anode current collector and an anode active material comprising lithium metal;

a separator between the cathode active material and the anode active material;

a polymer electrolyte lamination layer bonding the anode to the separator, the polymer electrolyte lamination layer comprising:

a crosslinked polymer having a molecular weight of between 400,000 g/mol and 900,000 g/mol, wherein the crosslinked polymer is selected from the group consisting of crosslinked PVDF-HFP, crosslinked PEGDMA, crosslinked polyDDA, crosslinked PVB, crosslinked PUA, crosslinked PEO, crosslinked PAN, crosslinked PMMA, and copolymers thereof;

a first lithium salt having a concentration of 3M or greater;

an ionic liquid; and 0 wt % to 15 wt. % of an anode additive; and a liquid electrolyte comprising a solvent and a second lithium salt with a concentration less than or equal to the concentration of the first lithium salt, wherein the polymer electrolyte lamination layer is configured to prevent the liquid electrolyte from contacting the anode.

4. The electrochemical cell of claim 3, wherein the first lithium salt is selected from the group consisting of one or more of LiFSI, LiTFSI, LiBOB, $LiPF_6$, $LiBF_4$, and $LiClO_4$.

5. The electrochemical cell of claim 3, wherein the polymer electrolyte lamination layer provides greater than 20 N/m dry lamination strength and greater than 20 N/m wet lamination strength between the anode and the separator.

6. The electrochemical cell of claim 3, wherein the polymer electrolyte lamination layer has an ionic conductivity of greater than $1.0 \times 10^{-5}$ S/cm.

7. The electrochemical cell of claim 6, wherein the polymer electrolyte lamination layer has an ionic conductivity of greater than $1.0 \times 10^{-4}$ S/cm.

8. The electrochemical cell of claim 3, wherein the polymer electrolyte lamination layer comprising the ionic liquid is N-propyl-N-methylpyrrolidinium bis(fluorosulfonyl)imide (Pyr13FSI), the first lithium salt is LiFSI, and the anode additive is LiBOB.

9. The electrochemical cell of claim 3, wherein the polymer electrolyte lamination layer comprising the crosslinked polymer is crosslinked PVDF-HFP with a molar ratio of PVDF:HFP of 15-40:1.

* * * * *